J. H. WESTON.
Coupling Tubular Lightning-Rods.

No. 139,841. Patented June 10, 1873.

UNITED STATES PATENT OFFICE.

JAMES H. WESTON, OF CINCINNATI, OHIO.

IMPROVEMENT IN COUPLING TUBULAR LIGHTNING-RODS.

Specification forming part of Letters Patent No. 139,841, dated June 10, 1873; application filed March 1, 1873.

*To all whom it may concern:*

Be it known that I, JAMES H. WESTON, of Cincinnati, Hamilton county, Ohio, have in-invented a new and useful Coupling for Tubular Lightning-Rods, of which the following is a specification:

My invention relates to a mode of joining or coupling the sections which compose a tubular lightning-rod, which combines the advantages of cheapness, ready manufacture and application, durability, and capacity of longitudinal play, so as to prevent the rod being thrown out of line and bent by expansion in hot weather, and of being snapped or drawn apart by contraction in cold weather.

Figure 1:
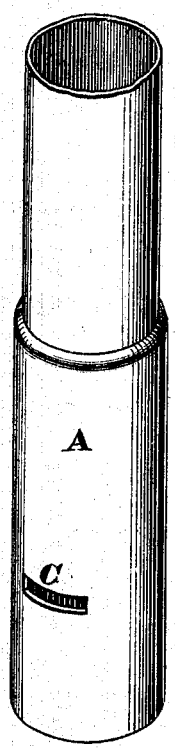
Figure 2:
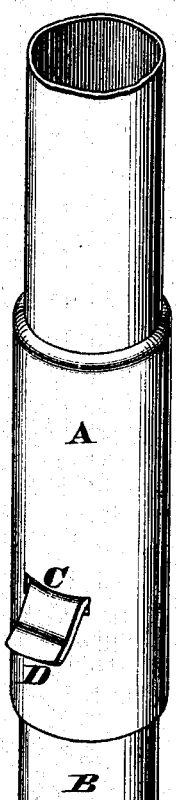
Figure 3:
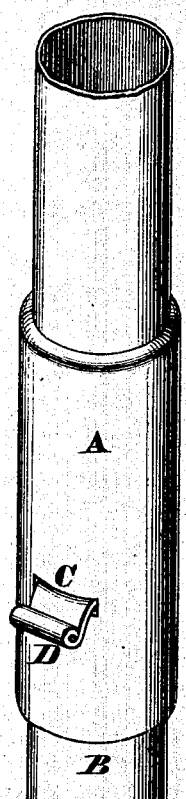

Figure 1 is a perspective view, representing parts of two consecutive sections embodying my invention; Fig. 2 represents the same parts as they appear when inserted one within the other for coupling. Fig. 3 represents the same parts completely coupled and locked.

The lower portion A of each section is sufficiently enlarged to take within it the upper end B of the next section, and has an orifice, C, to receive a tongue, D, on the said portion B, which tongue is so bent, as in Fig. 1, as on the insertion of the portion B to spring outward through the orifice C, and on the partial withdrawal of B to protrude through said orifice, as in Fig. 2. The extremity of said tongue is then bent backward, as in Fig. 3.

It will be seen that this operates to lock the sections firmly and securely to one another, and that, although thus securely fastened, they are capable of sliding one upon another when suffering changes of elongation or contraction under the influence of heat and cold, and that the upturned end of the tongue prevents the complete separation of the sections thus joined.

The tubes composing my lightning-rod are preferably circular in section, and of copper, or other suitable metal. Any two sections may be readily uncoupled when necessary by straightening out the tongue, pushing the sections together, giving them a slight relative rotation, enough to clear the tongue from the orifice, and then drawing them apart.

Although designed chiefly for tubular rods my coupling is applicable to solid rods whose extremities are provided with hollow cylinders adapted to telescope together as above.

I claim—

The tubular lightning-rod herein described, having the lower portion A of each section sufficiently enlarged to admit the upper end B, of the next section, the sections being connected and secured together by means of the orifice C and tongue D, all as herein shown and described.

In testimony of which invention I hereunto set my hand.

J. H. WESTON.

Attest:
GEO. H. KNIGHT,
H. SCHOONMAKER.